United States Patent
Rene

(10) Patent No.: US 10,291,585 B2
(45) Date of Patent: May 14, 2019

(54) AUTOMATIC PLACEHOLDER FINDER-FILLER

(71) Applicant: McAfee, Inc., Santa Clara, CA (US)

(72) Inventor: Mathieu Rene, Montreal (CA)

(73) Assignee: McAfee, LLC, Santa Clara, CA (US)

(*) Notice: Subject to any disclaimer, the term of this patent is extended or adjusted under 35 U.S.C. 154(b) by 284 days.

(21) Appl. No.: 15/108,230

(22) PCT Filed: Dec. 23, 2014

(86) PCT No.: PCT/US2014/072147
§ 371 (c)(1),
(2) Date: Jun. 24, 2016

(87) PCT Pub. No.: WO2015/112301
PCT Pub. Date: Jul. 30, 2015

(65) Prior Publication Data
US 2016/0330173 A1 Nov. 10, 2016

Related U.S. Application Data

(60) Provisional application No. 61/931,247, filed on Jan. 24, 2014.

(51) Int. Cl.
*H04L 29/06* (2006.01)
*G06F 21/41* (2013.01)
(Continued)

(52) U.S. Cl.
CPC ........ *H04L 63/0281* (2013.01); *G06F 17/243* (2013.01); *G06F 21/41* (2013.01);
(Continued)

(58) Field of Classification Search
CPC ..... G06F 17/243; G06F 21/41; H04L 63/0815
See application file for complete search history.

(56) References Cited

U.S. PATENT DOCUMENTS 7,383,339 B1 6/2008 Meenan et al.
7,818,440 B1 10/2010 Givoly
(Continued)

FOREIGN PATENT DOCUMENTS

CN 101083602 12/2007
CN 103282885 9/2013
(Continued)

OTHER PUBLICATIONS

Extended European Search Report, dated Jun. 27, 2017.
(Continued)

*Primary Examiner* — Thaddeus J Plecha
(74) *Attorney, Agent, or Firm* — Hanley, Flight & Zimmerman, LLC

(57) ABSTRACT

Methods and processes are disclosed for iOS based systems and mobile devices that permit a user to securely inject passwords and related information into environments that are traditionally impossible to control, along with preserving the security of confidential information against third party attacks be they intrusive or already embedded. The methods and processes utilize a locally installed proxy securely communicating with a remote server that permit injecting a secret into the code on devices that otherwise would not have the option of doing so. In at least one embodiment this is done by using network hooks and controlling the data flow between the injected component, a proxy and an application. It is contemplated that the user can control which credentials are used, without revealing them and minimizing attacker discovery.

18 Claims, 8 Drawing Sheets

(51) Int. Cl.
    *G06F 17/24* (2006.01)
    *H04L 9/08* (2006.01)
    *H04L 9/32* (2006.01)
(52) U.S. Cl.
    CPC .............. *H04L 9/08* (2013.01); *H04L 9/0861* (2013.01); *H04L 9/3226* (2013.01); *H04L 63/029* (2013.01); *H04L 63/0272* (2013.01); *H04L 63/0435* (2013.01); *H04L 63/0815* (2013.01); *H04L 63/083* (2013.01); *H04L 63/0823* (2013.01)

(56) References Cited

U.S. PATENT DOCUMENTS

| | | | |
|---|---|---|---|
| 8,332,464 | B2 | 12/2012 | Dispensa et al. |
| 8,370,933 | B1 | 2/2013 | Buckler |
| 8,438,635 | B2 | 5/2013 | Das et al. |
| 8,595,810 | B1 | 11/2013 | Ayed |
| 8,707,409 | B2 | 4/2014 | Shah et al. |
| 2002/0129064 | A1* | 9/2002 | Guthrie ............... G06F 9/44526 715/234 |
| 2003/0195971 | A1 | 10/2003 | Lai |
| 2004/0158746 | A1* | 8/2004 | Hu ........................... G06F 21/41 726/8 |
| 2005/0273849 | A1 | 12/2005 | Araujo et al. |
| 2006/0031407 | A1 | 2/2006 | Dispensa et al. |
| 2007/0282965 | A1 | 12/2007 | Kataoka |
| 2008/0313529 | A1* | 12/2008 | Gwozdz ............... G06F 17/243 715/224 |
| 2008/0320310 | A1 | 12/2008 | Florencio et al. |
| 2009/0063475 | A1 | 3/2009 | Pendse |
| 2010/0146260 | A1 | 6/2010 | Levow et al. |
| 2011/0154464 | A1 | 6/2011 | Agarwal et al. |
| 2012/0324526 | A1 | 12/2012 | Meyer et al. |
| 2015/0089579 | A1* | 3/2015 | Manza ............... H04L 63/0838 726/1 |

FOREIGN PATENT DOCUMENTS

| | | |
|---|---|---|
| EP | 2541861 A1 | 1/2013 |
| JP | 2007515706 | 6/2007 |
| JP | 2007323115 | 12/2007 |
| KR | 20090048655 | 5/2009 |
| WO | 2005114452 | 12/2005 |
| WO | 2012091991 | 7/2012 |

OTHER PUBLICATIONS

Hideyuki Fukuhara, "Secure Remote Access—Guideline for Establishment/Operation-," Computerworld Get Technology Right, Japan, IDG Japan Corp., Nov. 1, 2005, vol. 2, No. 11, pp. 79-89.
State intellectual Property Office, "Office Action," issued in connection with Chinese Patent Application No. 201480071045.6, dated Jul. 11, 2018, 9 pages.
Japanese Patent Office, "Office Action," issued in connection with Japanese Patent Application No. 2016-535707, dated May 30, 2017, 8 pages.
Korean Intellectual Property Office, "Office Action," issued in connection with Korean Patent Application No. 2016/7016769, dated Jan. 5, 2018, 14 pages.
Shimano, S., Adachi, T., & Kamon, K., & Koyama, K., (2010). "Open Service Repository/Enterprise Gateway." NEC Technical Journal, vol. 5(2), 62-67, 12 pages (English and Japanese copies).
International Search Report received in corresponding patent application No. PCT/US2014/072147, dated Apr. 22, 2015.
Japanese Patent Office, "Notice of Allowance," issued in connection with Japanese Patent Application No. 2017-182159, dated Oct. 31, 2018, 3 pages.
State intellectual Property Office, "Second Office Action," issued in connection with Chinese Patent Application No. 201480071045.6, dated Feb. 19, 2019, 7 pages.

* cited by examiner

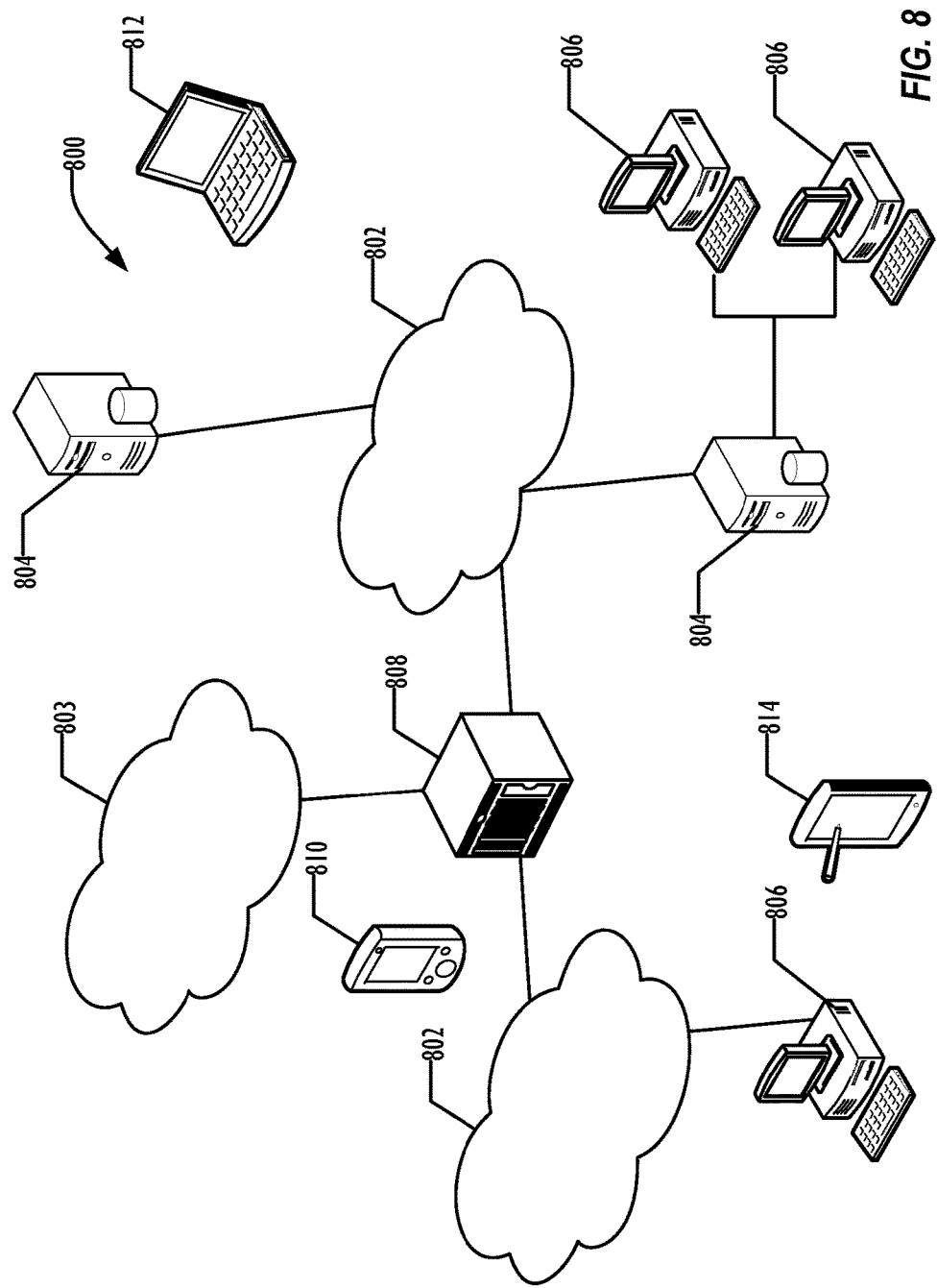

AUTOMATIC PLACEHOLDER FINDER-FILLER

CROSS REFERENCE TO RELATED APPLICATIONS

This Application claims priority to U.S. Provisional Application Ser. No. 61/931,247 entitled "Automatic placeholder finder-filler" filed Jan. 24, 2014, which is incorporated by reference in its entirety herein.

TECHNICAL FIELD

Embodiments described herein generally relate to the use of mobile devices and, in particular, to methods and processes for securely injecting confidential information into an environment that preserves the security and the confidential information.

BACKGROUND ART

Many mobile device applications require a user name and password and, possibly, information with greater syntactic and semantic depth and breadth in order to access the application and the therewith associated data. Moreover, users desire to make use of such access independent of the mobile device they are using. For an authenticated user to access their applications, the data associated therewith and their various accounts they usually try to adopt substantially similar identification approaches towards access fields and the naming conventions for the confidential data required for these fields. Users also often store their key information related thereto on third party accessible lists and are prone to revealing their credentials to a possible attacker or malicious software resident on their device. More and more websites and mobile applications are insisting on the use of stronger usernames and passwords as well as layers of information and interactions before allowing access to, one or another part of, their application and the associated user and/or application data. This makes access and retrieval secure but frustrating for users.

U.S. Pat. No. 8,438,635 to Das et al. discloses a mechanism for automatically logging into a cloud based system that does not accept token log-on credentials generated by a single sign-on service. In one embodiment, Das discloses a one-time password that is automatically generated and persisted. The generated password is used to log in automatically to a cloud based system that does not accept tokens generated by the web-ID providers and for connecting to other services. It is contemplated that this mechanism may be used in connection with operating systems such as the Windows®, Linux activating, and iOS activating operating systems. (WINDOWS is a registered trademark of Microsoft Corporation; LINUX is a registered trademark of Linux Torvalds; IOS is a registered trademark of Cisco Technology, Inc., licensed by Apple Inc. for their operating systems.)

U.S. Pat. No. 8,595,810 to Ayed discloses a method for automatically updating access security on existing applications with multi-factor authentication, intelligent auto-login, single sign-on, proximity logout, pro-active loss prevention and real-time incident notification using a wrapping function.

U.S. Pat. No. 8,370,933 to Buckler discloses a computer-implemented method for detecting the insertion of poisoned DNS server addresses into DHCP servers may include: 1) identifying a DNS server address provided by a DHCP server, 2) determining that the DNS server address provided by the DHCP server differs from a prior DNS server address provided by the DHCP server, 3) determining, due at least in part to the DNS server address differing from the prior DNS server address, that a DNS server located at the DNS server address provided by the DHCP server represents a potential security risk, and then 4) performing a security operation in an attempt to remedy the potential security risk.

U.S. Pat. No. 7,818,440 to Givoly discloses a system, method and computer program product are provided for monitoring digital assets communicated over a network. Initially, packets communicated between a first party and a plurality of other parties are passively inspected. Such packets collectively include at least a portion of data associated with a digital asset. Thereafter, based on the inspected packets, at least one aspect associated with the first party and at least one aspect associated with the digital asset are identified.

To protect against undesired intrusion, attacks, malicious software and data manipulation whilst assuring that legitimate users can seamlessly access applications and data once properly authenticated, a technique for injecting custom code onto mobile devices that is secure and convenient to users would be desirable.

This background information is provided as information believed by the applicant to be of possible relevance to the present invention. No admission is necessarily intended, nor should be construed, that any of the preceding information constitutes prior art against the present invention.

BRIEF DESCRIPTION OF DRAWINGS

FIG. 8 is a diagram illustrating a network of programmable devices according to one embodiment.

DESCRIPTION OF EMBODIMENTS

Figure 1:
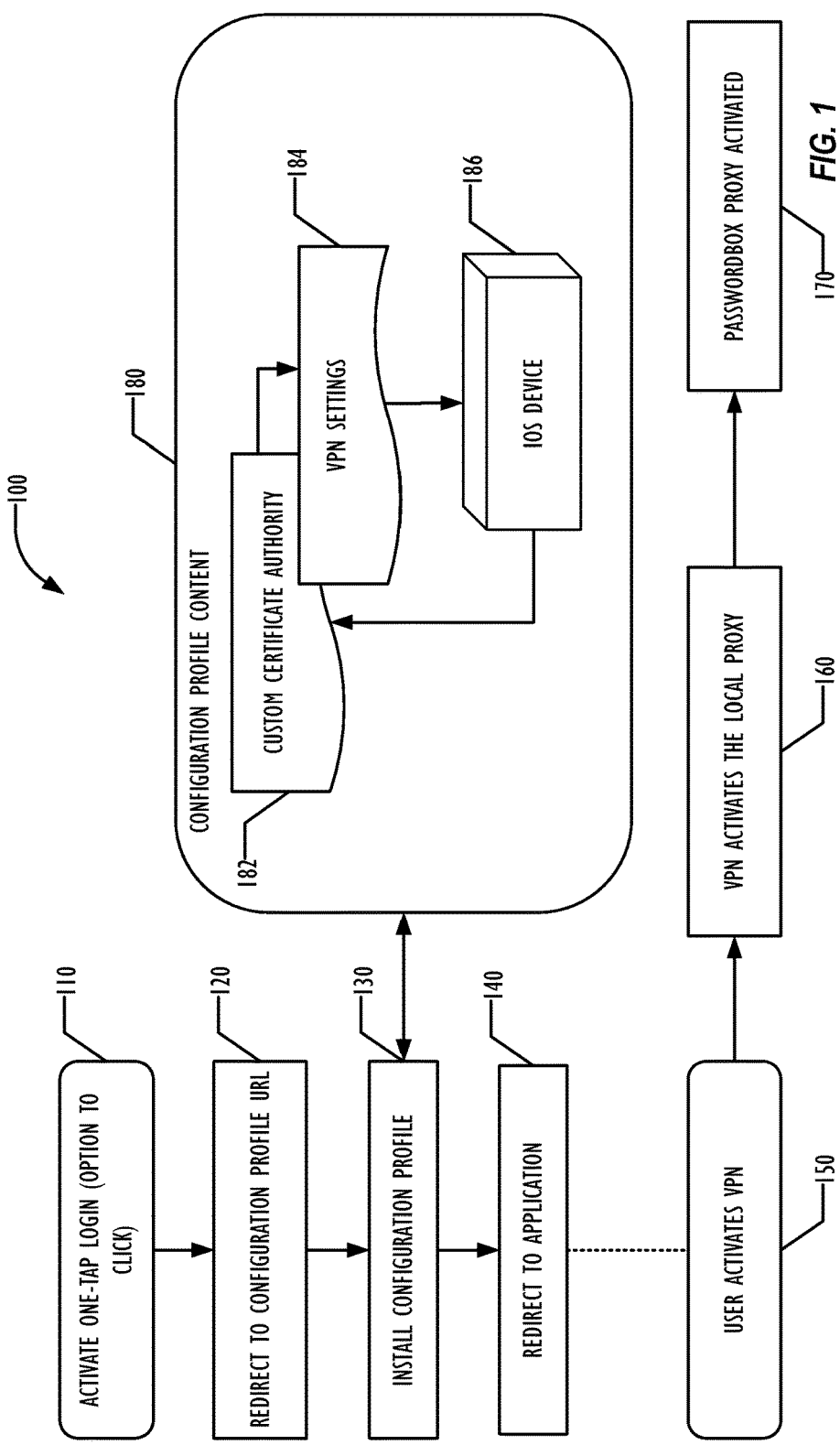
FIG. 1 is a flow chart illustrating an installation procedure of an iOS proxy-based application according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

As used herein, the term "a programmable device" can refer to a single programmable device or a plurality of programmable devices working together to perform the function described as being performed on or by a programmable device. Similarly, "a machine-readable medium" can refer to a single physical medium or a plurality of media that together may store the material described as being stored on the machine-readable medium.

As used herein, the term "application" refers to any executable software program, whether the program is a self-contained software or is a component of or contained by another program.

As used herein, the term "assets" refers to any piece of data that can be used to complete its list of tasks. It is contemplated that assets can include, but are not limited to, user credentials, usage statistics and personal information.

As used herein, the term "crypto key" refers to a series of bits used within a cryptographic algorithm or other encryption process, to transform Plain Text into Cipher Text or inversely Cipher Text into Plain Text, as will be readily understood by the skilled person.

As used herein, the term "dummy string" refers to a sequence of bits that can be used as a valid placeholder, that is, a valid string for, amongst others, an actual crypto key.

As used herein, the term "key generator" refers to a random number generator that may be typically be used to generate a crypto key.

As used herein, the term "modified Javascript" refers to an output of a script generator. Although the description is written in terms of an implementation using the JAVASCRIPT® scripting language, the invention is not so limited and may be implemented in any desired scripting language. (JAVASCRIPT is a registered trademark of Oracle America, Inc.)

As used herein, the term "one-tap" refers to a single touch of an active area on a touch screen.

As used herein, the term "script generator" refers to software that takes a standard script and inserts a session key in a desired location.

As used herein, the term "session key" refers to a cryptographic key that is used for the duration of a limited time period of an active session on a device or network.

As used herein, the term "VPN" refers to a virtual private network service, and associated settings or parameters.

Although much of the description below is written in terms of an implementation on an IOS operating system-based mobile device (, the invention is not so limited, and may be implemented in any desired operating system environment.

Various embodiments provide a novel and secure form filling technique for iOS devices. This technique installs an iOS application and proxy on an iOS device and proceeds to link the proxy to the device and browser whilst protecting any browser page based requests and device responses. Then, under user control, the application selects the action to be executed by automatically filling in user names, password and related confidential information.

In at least one embodiment, a local proxy is established for injecting script into a browser. The local proxy is downloaded, a configuration profile is obtained and installed, an internal virtual private network service is activated, and the local proxy is established through the internal virtual private network service. The local proxy can then be run.

In another embodiment, a local proxy is established and a connection made between the local proxy and a browser. A connection is also made between a remote server and the local proxy. The remote server is simulated the remote server to establish a server proxy. A request is received from at least one of the browser and the server proxy, and the request is sent to the remote server, Upon receiving a server response sent from the remote server to the browser, a positive script injection response is receive from the browser, based on the server response, buffering the server response. The injected script is generated and sent to the browser for use by the browser.

Embodiments allow injecting a secret into code on iOS devices that do not have an option to do so. This may be done by using network hooks and controlling the data flow between the injected component, a proxy, and an application. This allows the user to control which credentials are used, without revealing them and minimizing attacker discovery.

FIG. 1 is a flow diagram illustrating an installation procedure 100 according to one embodiment of an iOS proxy-based application, illustrating how an environment is setup. In block 110, the application is invoked, typically by a one-tap login. In block 120, the login is redirected to a configuration profile uniform resource locator (URL) corresponding to the application. The configuration profile 180 may include a custom certificate authority 182 and VPN settings 184, as well as information 186 about the iOS device.

In block 130, the configuration profile 180 is installed on the iOS device, then in block 140 the login is redirected to the actual application, launching the application. The application activates an internal iOS VPN service in block 150. The VPN service activates a local proxy in block 160, then activates a login proxy in block 170.

Figure 2:
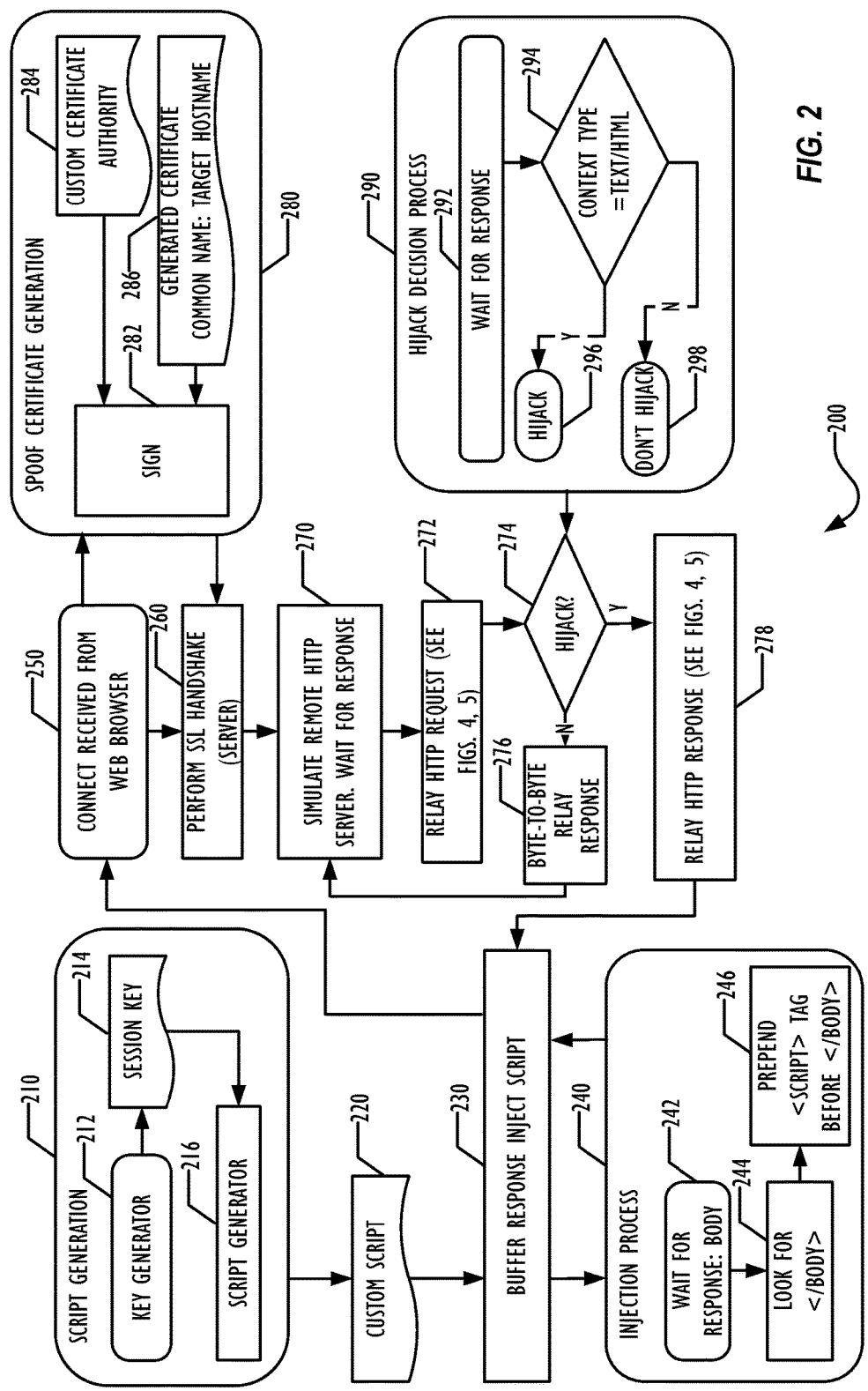
FIG. 2 is a flowchart illustrating a script injection and use process according to one embodiment.

FIG. 2 is a flow diagram illustrating a script injection and use technique 200 according to one embodiment. As illustrated, a man-in-the-middle (MITM) proxy is set up and a script prepared for injection. A decision technique is used to decide whether to trigger the injection.

A script generation phase 210 uses a key generator 212 to generate a session key 214. The session key 214 is then used by the script generator 216 to produce custom script 220. In block 230, the script is injected into a buffered response for the browser.

The injection process occurs in block 240. In block 242, the injection process waits for the body of the response. In block 244, the end of the body is located, then in block 246 the script is injected before the </body> tag that indicated the end of the body.

At the end of block 230, the web page contains injected Javascript code that is used to communication with the password management application on the iOS device 186.

The basic flow of control is:

The password management application sets up a local HTTP proxy and awaits a connection in block 250. Once the browser is connected and the user has navigated to a web page, an Secure Sockets Layer (SSL) handshake is performed with the server in block 260 providing the web page, allowing simulation of the remote server's identity in block 270 to setup a man-in-the middle (MITM) proxy. The browser is now ready to receive a request for a web page.

Upon receiving the HTTP request in block 270, the request is read and relayed to the server in block 272. This involves spoofing certificate generation, illustrated in block 280. In this certificate generation process, a customer certificate authority 284 and a generated certificate using the common name of the target hostname 286 are used to create a signature 282 for the SSL handshake, simulating the remote server's identify to set up an MITM proxy. The browser is now ready to receive an HTTP request in block 270. In block 272, an HTTP request is read from the client and relayed to the server.

Block 290 illustrates a hijack decision process according to one embodiment, which decides whether to inject a script into the response. In block 292, the proxy waits for a response from the server. In block 294, if the context type of the response is text/html, then the hijack decision process indicates hijack is desired; in block 296, if the context type is not text/html, then no hijacking is done. If hijacking (script insertion) is to be done, the response from the server is relayed and buffered, to allow script injection as described above. In block 274, if the decision is made to hijack the response and inject the script generated in block 210, then in block 278 the HTTP response is relayed, the response buffered, and the script injected as described above. If no hijacking is desired, then in block 276 a byte-to-byte relay of the response is performed, passing the response to block 270.

Figure 3:
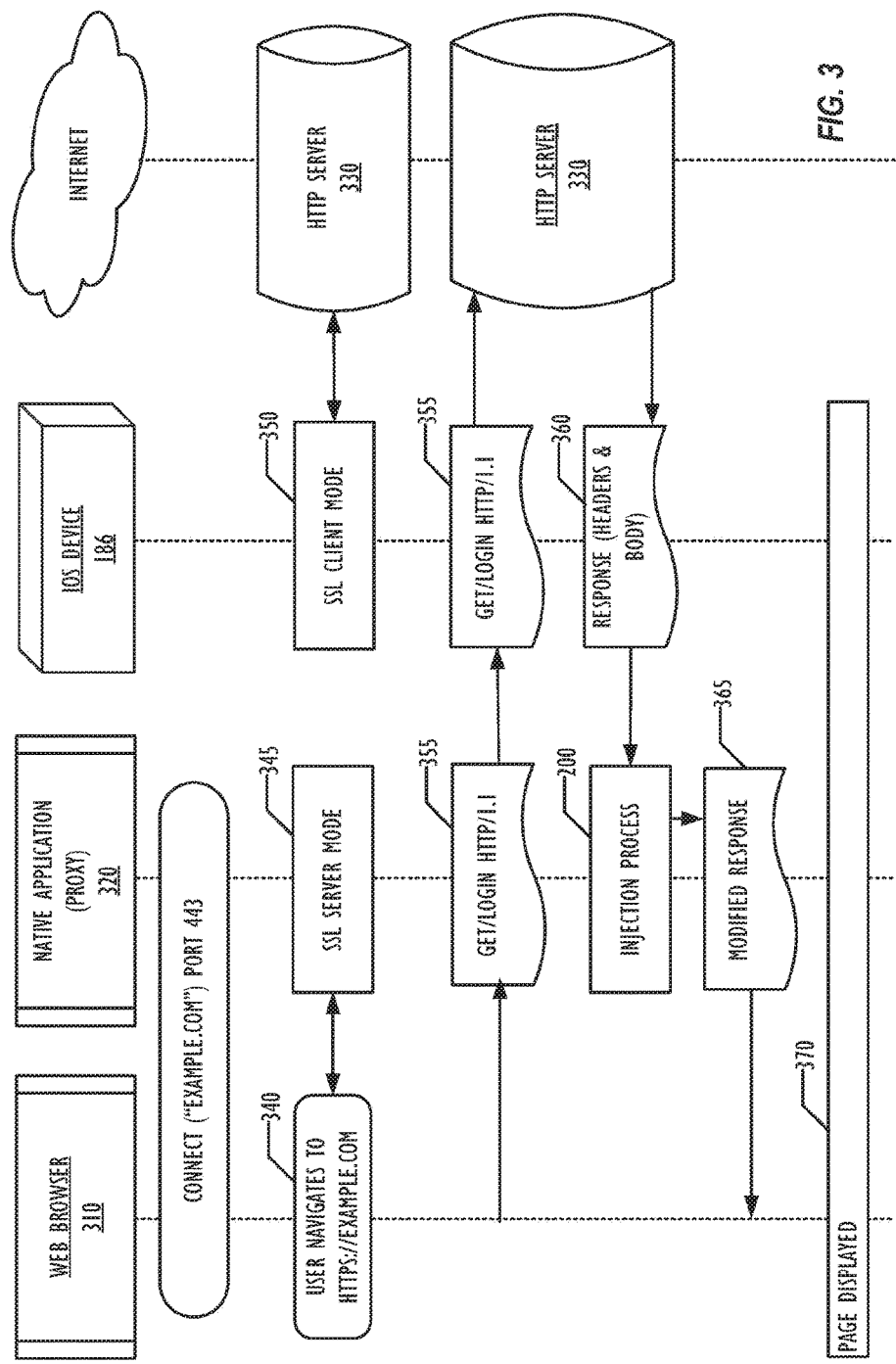
FIG. 3 is a flowchart illustrating a request and script injection process according to one embodiment.
Figure 4:
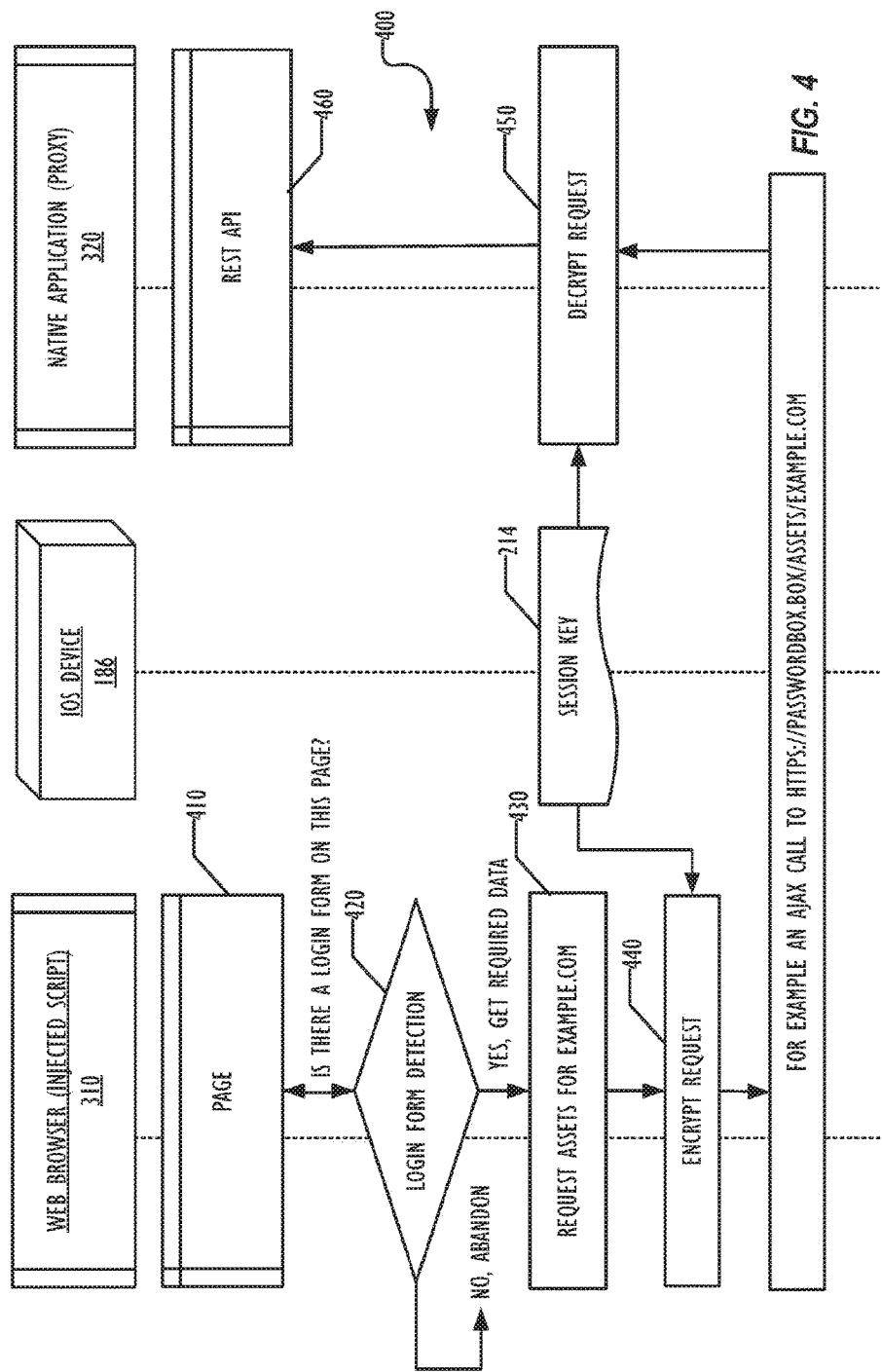
FIG. 4 is a flowchart illustrating a login process according to one embodiment.
Figure 5:
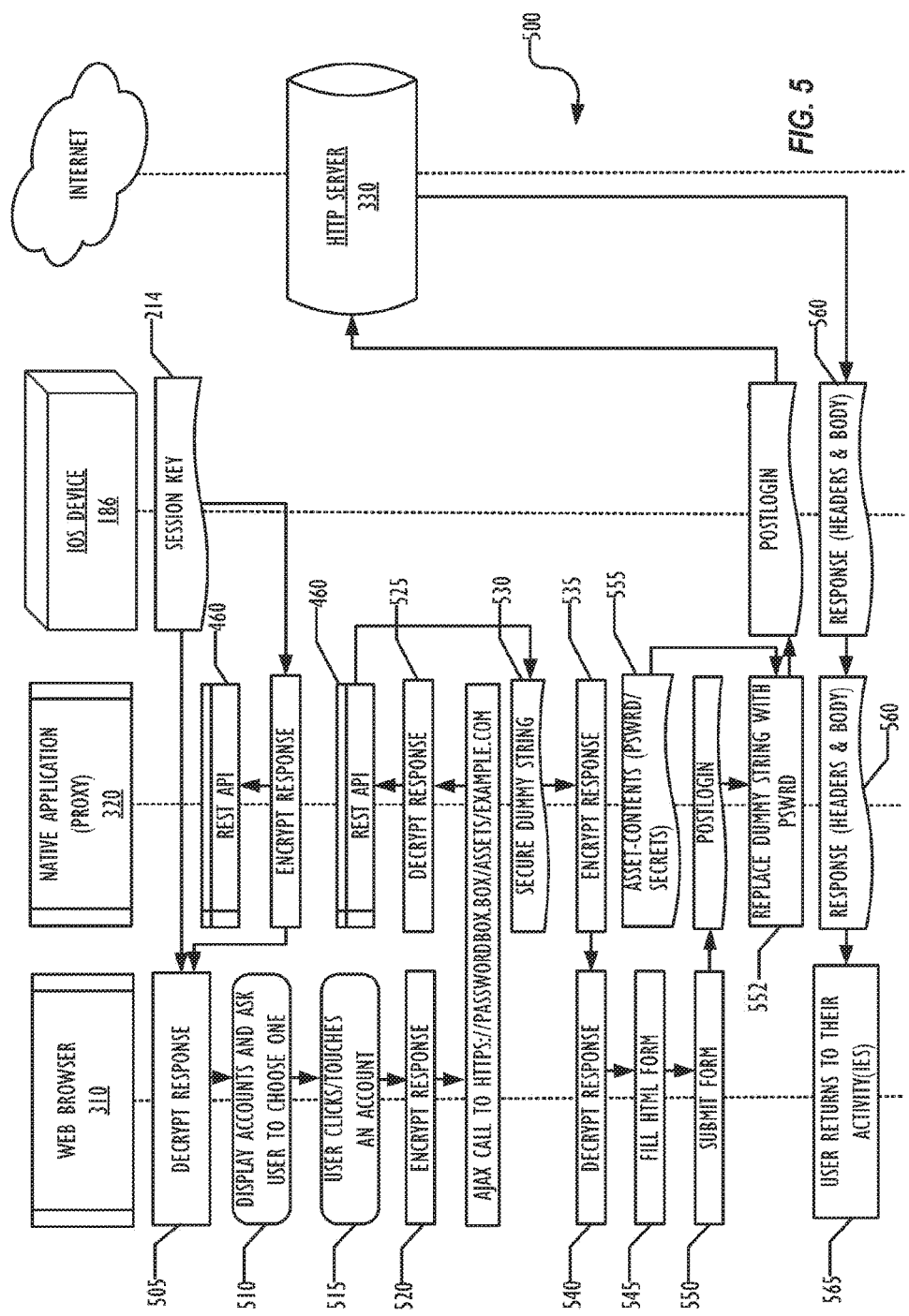
FIG. 5 is a flowchart illustrating a technique for a form filling process according to one embodiment.

FIG. 3 is a flow diagram illustrating data flow for the request and script injection process illustrated in FIG. 2 above. FIGS. 3-5 illustrate detailed data flows between the browser 310, the application 320, which provides the proxy, and the remote web server 330. (The remote web server 330 is illustrated twice in FIG. 3 to clarify the data flow, even though only a single remote web server 330 is involved.)

Upon a user's decision to navigate to a web page in block 340, the browser initiates a connection to the proxy 320, and sends a request to connect to the target server in block 345. In the example illustrated in FIG. 3, the connection is a secure connection using SSL, but similar techniques can be used for non-secure connections. In block 350, the iOS device 186 initiates an SSL handshake with the remote web server 330 as an SSL client, while the proxy does an SSL handshake in SSL server mode with the web browser 310 in block 345.

The browser 310 provides an HTTP login 355 to the proxy 320, which relays the login 355 to the iOS device 186 for delivery to the remote server 330. The remote server 330 responds with response 360, which is passed to the proxy 320 for performance of the injection process 200. The modified response 365 is then passed back to the browser 310 and the web page displayed in block 370.

FIG. 4 is a flow diagram illustrating a technique 400 for login form detection and a secure assets data flow. After the web page 410 finishes loading in the browser 310, the script injected by the script injection process of FIG. 2 determines whether the page contains a login form in block 420. Although many HTTP requests can be made for the page 410 (for example for images, style-sheets, etc.) this determination is made on the HTML page 410 that is currently loaded.

If there is a login form on the web page 410, then a request is made in block 430 for the assets and if there is no login form then the login is abandoned.

Blocks 430-440 illustrate the encryption of the HTTP request using a symmetric encryption algorithm with the associated symmetric cryptokey 214 as generated in the script generation process illustrated in FIG. 2. An example embodiment of such an encryption algorithm is AES CCM mode, but any type of symmetric encryption can be used.

The encrypted request is provided to the proxy 320, which uses the session key 214 to decrypt the request in block 450. In FIG. 4, the communication between the browser 310 and the application/proxy 320 uses asynchronous Javascript and XML (AJAX) between the web page 410 and the application 320. Other techniques can be used as desired. A REST API (Representational State Transfer Application Programming Interface) 460 may be used by the proxy 320 for this process. A REST API is a standard approach having a limited number of operations and with resources having their own unique resource indicators.

FIG. 5 is a flow diagram illustrating a secure form filling process 500 according to one embodiment. In this example, the first response contains a list of accounts that the user will be prompted to choose from. The response is decrypted in block 505, then the browser displays the accounts and asks the user to choose one in block 510. In block 515, the user selects an account, such as by clicking or touching an area associated with that account, which may be presented as an overlay inside the web page. Once the user decides to login, the login request is encrypted in block 520 and the login request is sent to the application 320. In one embodiment, the request is encrypted with the same symmetric cryptokey 214. The request indicates the user's choice of account.

In this example the encrypted response is provided via AJAX to the proxy 320, which decrypts the response in block 525, using the REST API. The response to this request contains a dummy string 530 that acts as a placeholder for the password. This string 530 is encrypted (block 535) by the proxy, decrypted by the browser (540) and injected into the right HTML input in block 545 using the techniques described above, and the form is then submitted automatically in block 550. This submission causes the browser to make a new HTTP request, containing the username and the dummy string which is the temporary stand-in for the password. The dummy string is then replaced by the user's password 555 in block 552 in real-time in the network stream directly as the login request is sent to the server 330.

The server 330 then provides a login response 560, which is passed through the iOS device 186 to the proxy 320 then to the browser 310. The user then returns to their activity or activities in block 565.

The techniques described above do not have to be performed on the iOS device 186, but may be provided by a VPN server that is cloud-based, but is capable of interacting with the local application proxy 320 for the script injection described above. In such embodiments, the VPN server may not have access to the session key or any of the assets that are to be injected into the webpage. The VPN server may be integrated into a carrier infrastructure as desired.

Figure 6:
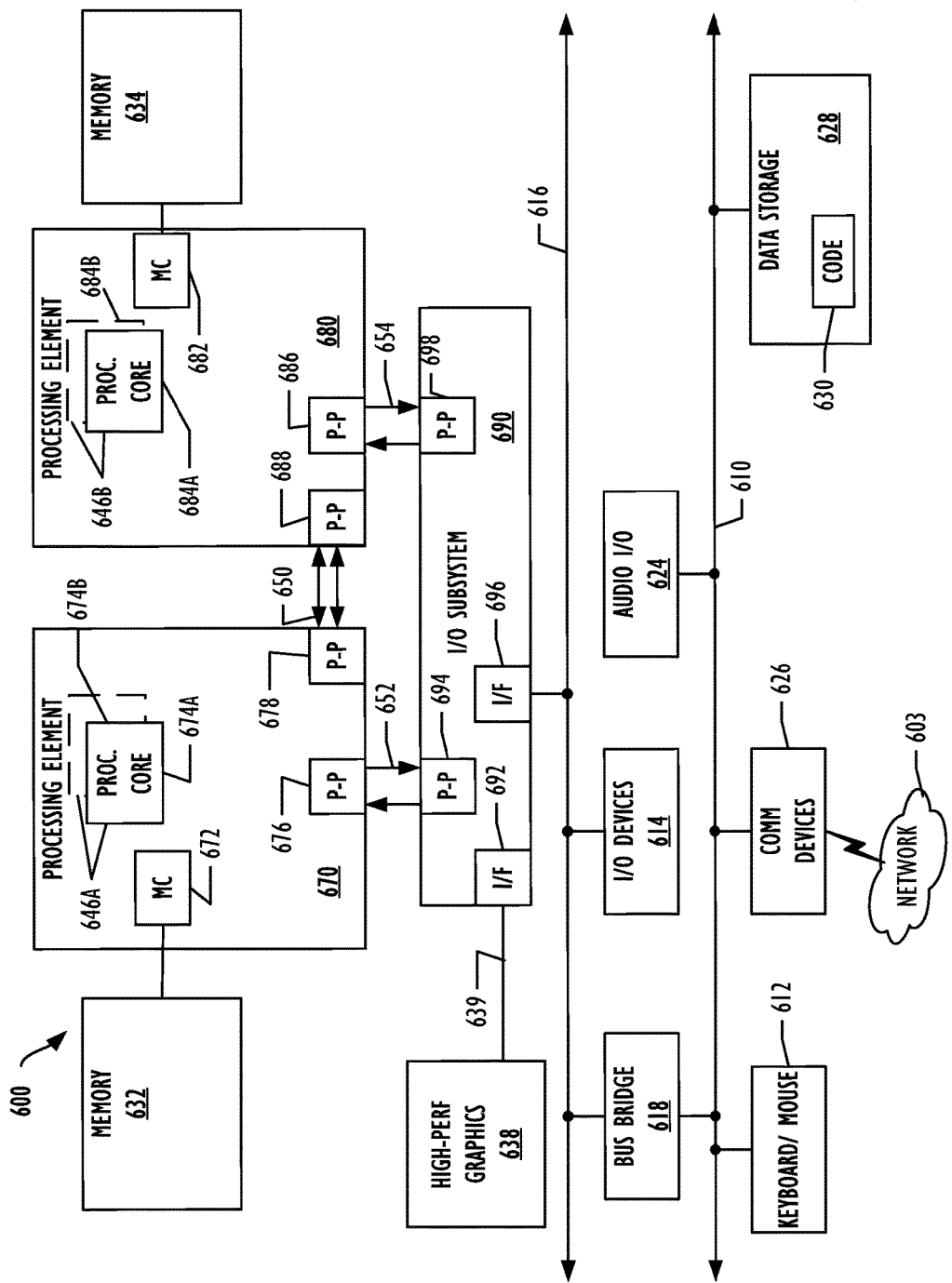
FIG. 6 is a diagram illustrating a computing device for use with techniques described herein according to one embodiment.

Referring now to FIG. 6, a block diagram illustrates a programmable device 600 that may be used for either the CRD 510 or the DWDs 520 in accordance with one embodiment. The programmable device illustrated in FIG. 6 is a multiprocessor programmable device 600 that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 6 may be implemented as multi-drop bus rather than point-to-point interconnects.

As illustrated in FIG. 6, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-4. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 6 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between the processing elements 670, 680 in terms of a spectrum of metrics of merit including architectural, microarchitectural, thermal, power consumption characteristics, and the like. These differences may effectively manifest themselves as asymmetry and heterogeneity amongst the processing elements 670, 680. In some embodiments, the various processing elements 670, 680 may reside in the same die package.

First processing element 670 may further include memory controller logic (MC) 672 and point-to-point (P-P) interfaces 676 and 678. Similarly, second processing element 680 may include a MC 682 and P-P interfaces 686 and 688. As illustrated in FIG. 6, MCs 672 and 682 couple the processing elements 670, 680 to respective memories, namely a memory 632 and a memory 634, which may be portions of main memory locally attached to the respective processors. While MC logic 672 and 682 is illustrated as integrated into the processing elements 670, 680, in some embodiments the MC logic may be discrete logic outside the processing elements 670, 680 rather than integrated therein.

Processing element 670 and processing element 680 may be coupled to an I/O subsystem 690 via P-P interfaces 676 and 686 and P-P interconnects 652 and 654, respectively. As illustrated in FIG. 6, I/O subsystem 690 includes P-P interfaces 694 and 698. Furthermore, I/O subsystem 690 includes an interface 692 to couple I/O subsystem 690 with a high performance graphics engine 638. In one embodiment, bus 639 may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 6, various I/O devices 614 may be coupled to first link 616, along with a bridge 618 which may couple first link 616 to a second link 610. In one embodiment, second link 610 may be a low pin count (LPC) bus. Various devices may be coupled to second link 610 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 610.

Note that other embodiments are contemplated. For example, instead of the point-to-point architecture of FIG. 6, a system may implement a multi-drop bus or another such communication topology. Although links 616 and 610 are illustrated as busses in FIG. 6, any desired type of link may be used. In addition, the elements of FIG. 6 may alternatively be partitioned using more or fewer integrated chips than illustrated in FIG. 6. For example, the components may be implemented as networked (LAN, enterprise network, Internet and/or distributed in the cloud) computing devices (real or virtual) or microcontrollers which jointly perform the 230 function.

Figure 7:
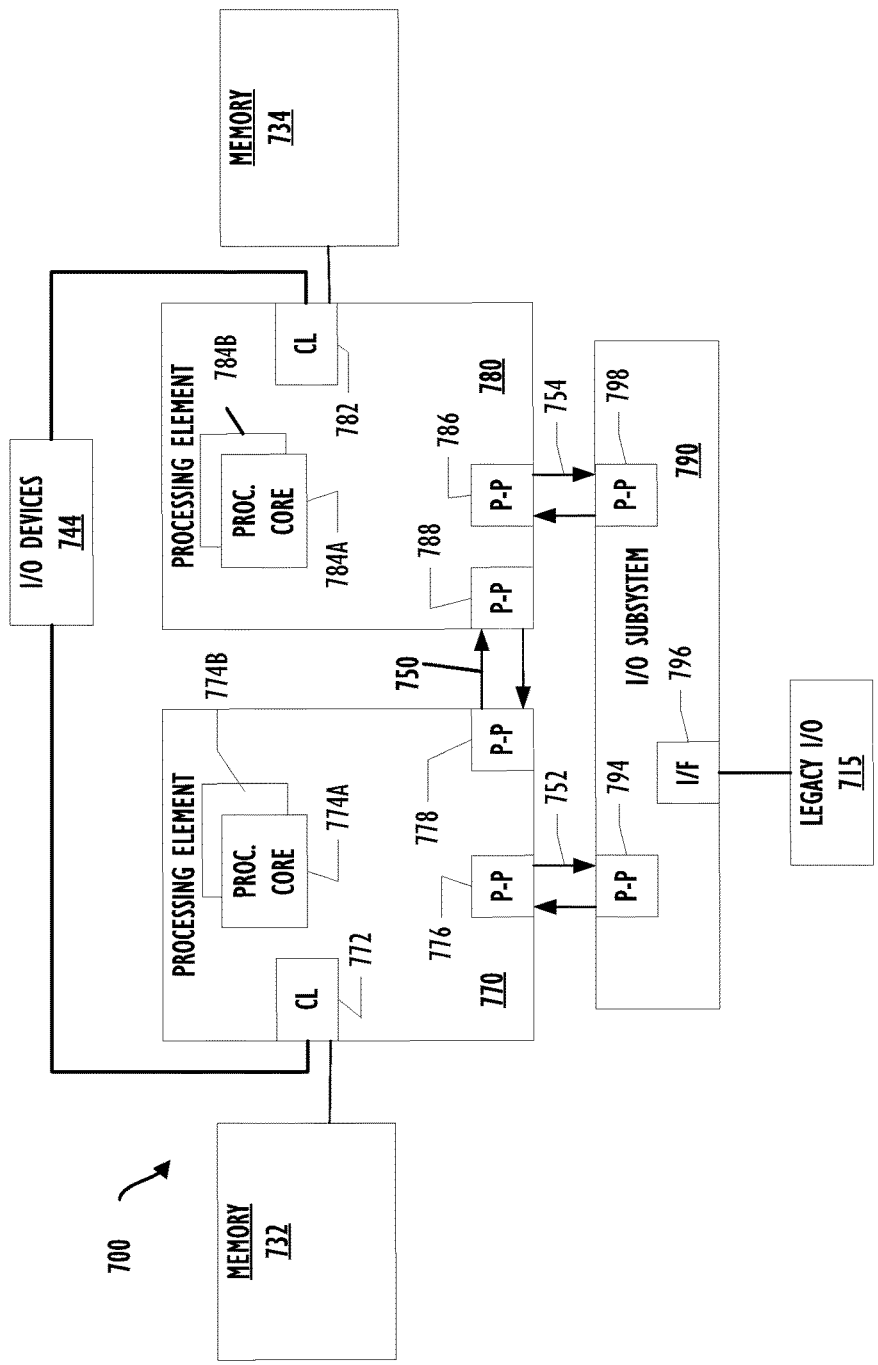
FIG. 7 is a block diagram illustrating a computing device for use with techniques described herein according to another embodiment.

Referring now to FIG. 7, a block diagram illustrates a programmable device 700 according to another embodiment. Certain aspects of FIG. 6 have been omitted from FIG. 7 in order to avoid obscuring other aspects of FIG. 7.

FIG. 9 illustrates that processing elements 770, 780 may include integrated memory and I/O control logic ("CL") 772 and 782, respectively. In some embodiments, the CL 772, 782 may include memory control logic (MC) such as that described above in connection with FIG. 6. In addition, CL 772, 782 may also include I/O control logic. FIG. 7 illustrates that not only may the memories 732, 734 be coupled to the CL 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 7 as processor cores 774A, 774B, 784A, and 784B. As illustrated in FIG. 7, I/O subsystem 790 includes P-P interfaces 794 and 798 that connect to P-P interfaces 776 and 786 of the processing elements 770 and 780 with interconnects 752 and 754. Processing elements 770 and 780 may also be interconnected by interconnect 750 and interfaces 778 and 788, respectively.

The programmable devices depicted in FIGS. 6 and 7 are schematic illustrations of embodiments of programmable devices that may be utilized to implement various embodiments discussed herein. Various components of the programmable devices depicted in FIGS. 6 and 7 may be combined in a system-on-a-chip (SoC) architecture.

Referring now to FIG. 8, an example infrastructure 800 in which the techniques described above may be implemented is illustrated schematically. Infrastructure 800 contains computer networks 802. Computer networks 802 may include many different types of computer networks available today, such as the Internet, a corporate network, or a Local Area Network (LAN). Each of these networks can contain wired or wireless programmable devices and operate using any number of network protocols (e.g., TCP/IP). Networks 802 may be connected to gateways and routers (represented by 808), end user computers 806, and computer servers 804. Infrastructure 800 also includes cellular network 803 for use with mobile communication devices. Mobile cellular networks support mobile phones and many other types of devices. Mobile devices in the infrastructure 800 are illustrated as mobile phones 810, laptops 812, and tablets 814. A mobile device such as mobile phone 810 may interact with one or more mobile provider networks as the mobile device moves, typically interacting with a plurality of mobile network towers (not shown) for connecting to the cellular network 803. Although referred to as a cellular network in FIG. 8, a mobile device may interact with towers of more than one provider network, as well as with multiple non-cellular devices such as wireless access points and routers 808. In addition, the mobile devices 810, 812, and 814 may interact with non-mobile devices such as computers 804 and 806 for desired services.

The following examples pertain to further embodiments.

Example 1 is a method, comprising: downloading a local proxy responsive to a request by a browser; obtaining and installing a configuration profile; activating an internal virtual private network service; establishing the local proxy through the internal virtual private network service; and running the local proxy.

In example 2, the subject matter of Example 1 can optionally include, wherein the request is an HTTP request.

In example 3, the subject matter of any of Examples 1-2 can optionally include, wherein the local proxy interacts with a remote virtual private network server.

Example 4 is a machine readable medium on which are stored instructions, the instructions comprising instructions that when executed cause a machine to: establish a local proxy and a connection between the local proxy and a browser; establish a connection between a remote server and the local proxy; simulate the remote server to establish a server proxy; receive a request from at least one of the browser and the server proxy and sending the request to the remote server; receive a server response sent from the remote server to the browser; receive a positive script injection response from the browser, the positive script injection response based on the server response; buffer the server response; generate an injected script; and send the injected script to the browser.

In example 5, the subject matter of Example 4 can optionally include, wherein the instructions that when executed cause the machine to send the injected script to the browser comprise instructions that when executed cause the machine to: modify the buffered server response with the injected script to create a modified server response; and send the modified server response to the browser.

In example 6, the subject matter of any of Examples 4-5 can optionally include, wherein the instructions further comprise instructions that when executed cause the machine to: render a modified web page on the browser.

In example 7, the subject matter of Example 4 can optionally include, wherein the instructions further comprise instructions that when executed cause the machine to: establish the presence of a login form in a loaded web page; generate an asset request; encrypt the asset request with a symmetric algorithm; send the asset request to the remote server; receive an asset request response from the remote server, the asset request response containing requested assets; decrypt the asset request response with the symmetric algorithm; and send the requested assets to at least one of the local proxy and the browser.

In example 8, the subject matter of Example 7 can optionally include, wherein the instructions that when executed cause the machine to generate injected script comprise instructions that when executed cause the machine to generate a cryptokey securely, and wherein the symmetric algorithm uses the secured cryptokey to encrypt the asset request and decrypt the asset request response.

In example 9, the subject matter of Example 7 can optionally include, wherein the instructions that when executed cause the machine to establish the presence of a login form in a loaded webpage comprise instructions that when executed cause the machine to: send an account selection form to the browser, the account selection form including at least one account selection; generate an account selection request, the account selection request including one of the at least one account selection; and receive an account selection request from the browser.

In example 10, the subject matter of Example 9 can optionally include, wherein the account selection request is encrypted.

In example 11, the subject matter of Example 10 can optionally include, wherein the account selection request is encrypted using a symmetric encryption algorithm.

In example 12, the subject matter of Example 10 can optionally include, wherein the instructions further comprise instructions that when executed cause the machine to: generate an account selection response, the account selection response including a dummy string; send the account selection response to the browser; inject the dummy string into a webpage input field in the loaded web page; receive a second request from the browser, the second request including the dummy string; and replace in real-time the dummy string with a password, the password retrieved from the remote server.

Example 13 is a programmable device, comprising: a processor; and a memory, on which are stored instructions, comprising instructions that when executed cause the processor to: establish a local proxy and a connection between the local proxy and a browser; establish a connection between a remote server and the local proxy; simulate the remote server to establish a server proxy; receive a request from at least one of the browser and the server proxy and sending the request to the remote server; receive a server response sent from the remote server to the browser; receive a positive script injection response from the browser, the positive script injection response based on the server response; buffer the server response; generate an injected script; and send the injected script to the browser.

In example 14, the subject matter of Example 13 can optionally include, wherein the instructions that when executed cause the processor to send the injected script to the browser comprise instructions that when executed cause the processor to: modify the buffered server response with the injected script to create a modified server response; and send the modified server response to the browser.

In example 15, the subject matter of any of Examples 13-14 can optionally include, wherein the instructions further comprise instructions that when executed cause the processor to: render a modified web page on the browser.

In example 16, the subject matter of any of Examples 13-14 can optionally include, wherein the instructions further comprise instructions that when executed cause the processor to: establish the presence of a login form in a loaded webpage; generate an asset request; encrypt the asset request with a symmetric algorithm;

send the asset request to the remote server; receive an asset request response from the remote server, the asset request response containing requested assets; decrypt the asset request response with the symmetric algorithm; and send the requested assets to at least one of the local proxy and the browser.

In example 17, the subject matter of Example 16 can optionally include, wherein the instructions that when executed cause the processor to generate injected script comprise instructions that when executed cause the processor to generate a cryptokey securely, and wherein the symmetric algorithm uses the secured cryptokey to encrypt the asset request and decrypt the asset request response.

In example 18, the subject matter of Example 16 can optionally include, wherein the instructions that when executed cause the processor to establish the presence of a login form in a loaded web page comprise instructions that when executed cause the processor to: send an account selection form to the browser, the account selection form including at least one account selection; generate an account selection request, the account selection request including one of the at least one account selection; and receive an account selection request from the browser.

In example 19, the subject matter of Example 18 can optionally include, wherein the account selection request is encrypted.

In example 20, the subject matter of Example 19 can optionally include, wherein the account selection request is encrypted using a symmetric encryption algorithm.

In example 21, the subject matter of Example 19 can optionally include, wherein the instructions further comprise instructions that when executed cause the processor to: generate an account selection response, the account selection response including a dummy string; send the account selection response to the browser; inject the dummy string into a webpage input field in the loaded web page; receive a second request from the browser, the second request including the dummy string; and replace in real-time the dummy string with a password, the password retrieved from the remote server.

Example 22 is a programmable device, comprising: a processor; a memory, on which are stored instructions, comprising instructions that when executed cause the processor to: establish a local proxy and a connection between the local proxy and a browser; establish a connection between a remote server and the local proxy; simulate the remote server to establish a server proxy; receive a request from at least one of the browser and the server proxy and sending the request to the remote server; receive a server response sent from the remote server to the browser; receive a positive script injection response from the browser, the positive script injection response based on the server response; buffer the server response; generate an injected script; modify the buffered server response with the injected script to create a modified server response; and send the modified server response to the browser.

In example 23, the subject matter of Example 22 can optionally include, wherein the instructions further comprise instructions that when executed cause the processor to: establish the presence of a login form in a loaded web page; generate an asset request; encrypt the asset request with a symmetric algorithm; send the asset request to the remote server; receive an asset request response from the remote server, the asset request response containing requested assets; decrypt the asset request response with the symmetric algorithm; and, send the requested assets to at least one of the local proxy and the browser.

In example 24, the subject matter of any of Examples 22-23 can optionally include, wherein the instructions further comprise instructions that when executed cause the processor to: generate an account selection response, the account selection response including a dummy string; send the account selection response to the browser; inject the dummy string into a webpage input field in the loaded web page; receive a second request from the browser, the second request including the dummy string; and replace in real-time the dummy string with a password, the password retrieved from the remote server.

In example 25, the subject matter of Example 23 can optionally include, wherein the instructions that when executed cause the processor to generate injected script comprise instructions that when executed cause the processor to generate a cryptokey securely, and wherein the symmetric algorithm uses the secured cryptokey to encrypt the asset request and decrypt the asset request response.

In example 26, the subject matter of Example 23 can optionally include, wherein the instructions that when executed cause the processor to establish the presence of a login form in a loaded webpage comprise instructions that when executed cause the processor to: send an account selection form to the browser, the account selection form including at least one account selection; generate an account selection request, the account selection request including one of the at least one account selection; and receive an account selection request from the browser.

Example 27 is a programmable device, comprising: a processor; a memory coupled with the processor, on which are stored instructions, comprising instructions that when executed cause the processor to: download a local proxy responsive to a request by a browser; obtain and install a configuration profile; activate an internal virtual private network service; establish the local proxy through the internal virtual private network service; and run the local proxy.

In example 28, the subject matter of Example 27 can optionally include, wherein the request is an HTTP request.

In example 29, the subject matter of any of Examples 27-28 can optionally include, wherein the local proxy interacts with a remote virtual private network server.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A machine readable storage device or storage disk comprising instructions that, when executed, cause a machine to at least:
   establish a local proxy and a connection between the local proxy and a browser;
   establish a connection between a remote server and the local proxy;
   simulate the remote server to establish a server proxy;
   obtain a request received from at least one of the browser or the server proxy;
   send the request to the remote server;
   obtain a server response sent from the remote server to the browser;

obtain a positive script injection response received from the browser, the positive script injection response based on the server response;
buffer the server response;
generate an injected script; and
send the injected script to the browser.

2. The machine readable storage device or storage disk of claim 1, wherein the instructions, when executed, cause the machine to send the injected script to the browser by:
modifying the buffered server response with the injected script to create a modified server response; and
sending the modified server response to the browser.

3. The machine readable storage device or storage disk of claim 1, wherein the instructions, when executed, cause the machine to:
render a modified web page on the browser.

4. The machine readable storage device or storage disk of claim 1, wherein the instructions, when executed, cause the machine to:
establish a presence of a login form in a loaded webpage;
generate an asset request;
encrypt the asset request with a symmetric algorithm;
send the asset request to the remote server;
obtain an asset request response received from the remote server, the asset request response containing requested assets;
decrypt the asset request response with the symmetric algorithm; and
send the requested assets to at least one of the local proxy or the browser.

5. The machine readable storage device or storage disk of claim 4, wherein the instructions, when executed, cause the machine to generate the injected script by:
generating a cryptokey, the symmetric algorithm to use the cryptokey to encrypt the asset request and decrypt the asset request response.

6. The machine readable storage device or storage disk of claim 4, wherein the instructions, when executed, cause the machine to establish the presence of the login form in the loaded webpage by:
sending an account selection form to the browser, the account selection form including at least one account selection;
generating an account selection request, the account selection request including one of the at least one account selection; and
obtaining the account selection request from the browser.

7. The machine readable storage device or storage disk of claim 6, wherein the account selection request is encrypted.

8. The machine readable storage device or storage disk of claim 7, wherein the account selection request is encrypted using the symmetric encryption algorithm.

9. The machine readable storage device or storage disk of claim 7, wherein the instructions, when executed, further cause the machine to:
generate an account selection response, the account selection response including a dummy string;
send the account selection response to the browser;
inject the dummy string into a webpage input field in the loaded web page;
obtain a second request received from the browser, the second request including the dummy string; and
replace in real-time the dummy string with a password, the password retrieved from the remote server.

10. A programmable device, comprising:
a processor; and
memory including instructions that, when executed, cause the processor to:
establish a local proxy and a connection between the local proxy and a browser;
establish a connection between a remote server and the local proxy;
simulate the remote server to establish a server proxy;
obtain a request received from at least one of the browser or the server proxy;
send the request to the remote server;
obtain a server response sent from the remote server to the browser;
obtain a positive script injection response received from the browser, the positive script injection response based on the server response,
buffer the server response;
generate an injected script; and
send the injected script to the browser.

11. The programmable device of claim 10, wherein the instructions, when executed, cause the processor to send the injected script to the browser by:
modifying the buffered server response with the injected script to create a modified server response; and
sending the modified server response to the browser.

12. The programmable device of claim 10, wherein the instructions, when executed, further cause the processor to:
render a modified web page on the browser.

13. The programmable device of claim 10, wherein the instructions, when executed, further cause the processor to:
establish a presence of a login form in a loaded webpage;
generate an asset request;
encrypt the asset request with a symmetric algorithm;
send the asset request to the remote server;
obtain an asset request response received from the remote server, the asset request response containing requested assets;
decrypt the asset request response with the symmetric algorithm; and
send the requested assets to at least one of the local proxy or the web browser.

14. The programmable device of claim 13, wherein the instructions, when executed, cause the processor to generate the injected script by generating a cryptokey, the symmetric algorithm to use the cryptokey to encrypt the asset request and decrypt the asset request response.

15. The programmable device of claim 13, wherein the instructions, when executed, cause the processor to establish the presence of the login form in the loaded webpage by:
sending an account selection form to the browser, the account selection form including at least one account selection;
generating an account selection request, the account selection request including one of the at least one account selection; and
obtain the account selection request from the browser.

16. The programmable device of claim 15, wherein the account selection request is encrypted.

17. The programmable device of claim 16, wherein the account selection request is encrypted using the symmetric encryption algorithm.

18. The programmable device of claim 16, wherein the instructions, when executed, further cause the processor to:
generate an account selection response, the account selection response including a dummy string;
send the account selection response to the browser;
inject the dummy string into a webpage input field in the loaded web page;

obtain a second request received from the browser, the second request including the dummy string; and replace in real-time the dummy string with a password, the password retrieved from the remote server.

* * * * *